United States Patent [19]

Albert et al.

[11] Patent Number: 5,152,614
[45] Date of Patent: Oct. 6, 1992

[54] LINEAR BALL BUSH

[75] Inventors: Ernst Albert, Sand/Main; Günter Blaurock, Niederwerrn, both of Fed. Rep. of Germany

[73] Assignee: Deutsche Star GmbH, Schweinfurt, Fed. Rep. of Germany

[21] Appl. No.: 670,360

[22] Filed: Mar. 14, 1991

Related U.S. Application Data

[63] Continuation of Ser. No. 424,874, Oct. 20, 1989, abandoned.

[30] Foreign Application Priority Data

Oct. 21, 1988 [DE] Fed. Rep. of Germany ....... 3835971
Mar. 31, 1989 [DE] Fed. Rep. of Germany ....... 3910469

[51] Int. Cl.$^5$ .............................................. F16G 29/06
[52] U.S. Cl. ........................................ 384/43; 384/45
[58] Field of Search .................... 384/15, 16, 43–45; 464/168

[56] References Cited

U.S. PATENT DOCUMENTS

| | | | |
|---|---|---|---|
| 3,545,826 | 12/1970 | Magee et al. | 384/43 |
| 3,560,061 | 2/1971 | Shaw, Jr. | 384/44 |
| 3,933,396 | 1/1976 | Nilsson | 384/43 |
| 4,128,278 | 12/1978 | Headen et al. | 384/43 |
| 4,206,951 | 6/1980 | Ernst et al. | 384/43 |
| 4,372,623 | 2/1983 | Koschmieder | 384/43 |
| 4,376,557 | 3/1983 | Teramachi | 384/45 |
| 4,417,771 | 11/1983 | Teramachi | 384/45 |
| 4,527,842 | 7/1985 | Teramachi | 384/45 |
| 4,553,796 | 11/1985 | Walter et al. | 384/45 |
| 4,572,591 | 2/1986 | Walter et al. | 384/45 |
| 4,695,170 | 9/1987 | Teramachi | 384/43 X |
| 4,717,264 | 1/1988 | Walter et al. | 389/43 |

FOREIGN PATENT DOCUMENTS

| | | |
|---|---|---|
| 1287382 | 1/1969 | Fed. Rep. of Germany . |
| 1949182 | 11/1970 | Fed. Rep. of Germany . |
| 2003535 | 8/1971 | Fed. Rep. of Germany . |
| 2626399 | 12/1977 | Fed. Rep. of Germany . |
| 3326601 | 2/1985 | Fed. Rep. of Germany . |
| 3507760 | 9/1985 | Fed. Rep. of Germany . |
| 3512013 | 10/1986 | Fed. Rep. of Germany . |
| 8811178 | 12/1988 | Fed. Rep. of Germany . |
| 2335727 | 7/1977 | France . |

OTHER PUBLICATIONS

SKF prospectus, "Linearkugellager", pp. 36–38 (no date available).

*Primary Examiner*—Daniel P. Stodola
*Assistant Examiner*—William G. Battista, Jr.
*Attorney, Agent, or Firm*—Brumbaugh, Graves, Donohue & Raymond

[57] ABSTRACT

A linear ball bush comprises a cage having a cage axis and a plurality of ball circuits, at least one ball circuit comprising two straight ball rows substantially parallel to the cage axis and two curved ball rows connecting the two straight ball rows, and a plurality of runner plates which each provide for the guidance of the ball circuit. The runner plates comprise straight track sections continued with substantially constant profile over their entire length, and between these a middle rib which is continued to each of the runner plate ends with substantially constant profile. The curved track sections connect the straight track sections and pass transversely through the middle rib.

16 Claims, 12 Drawing Sheets

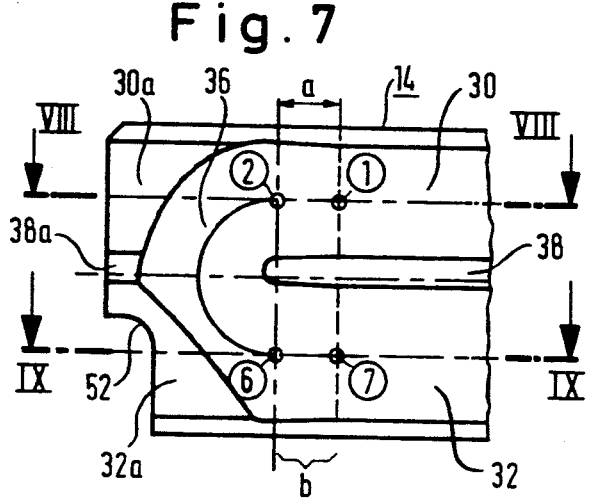
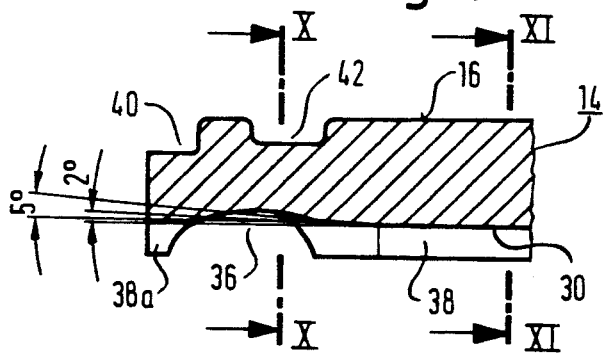
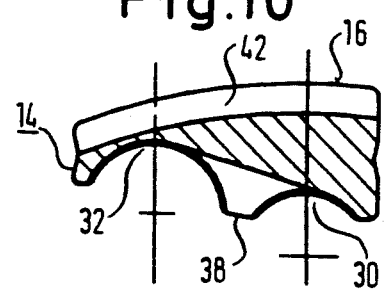
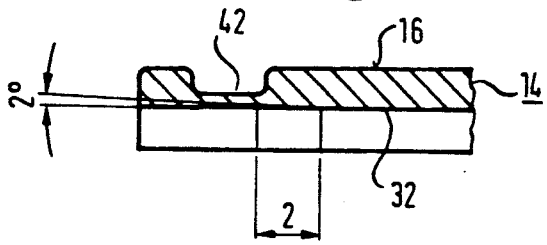
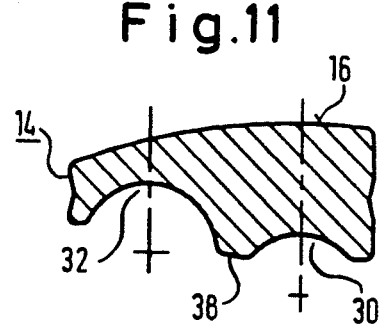

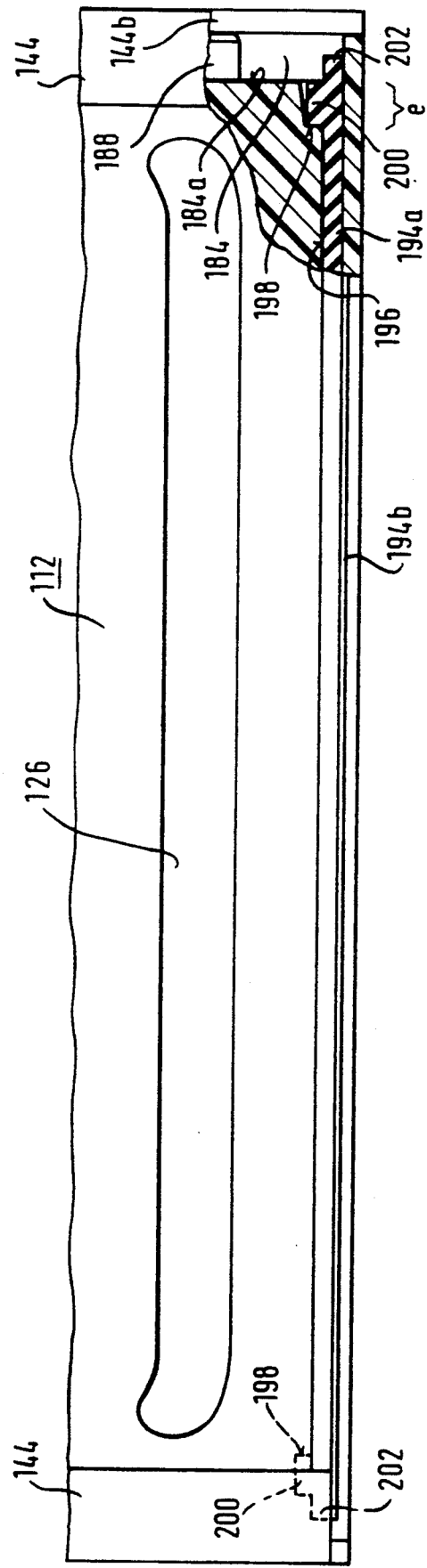
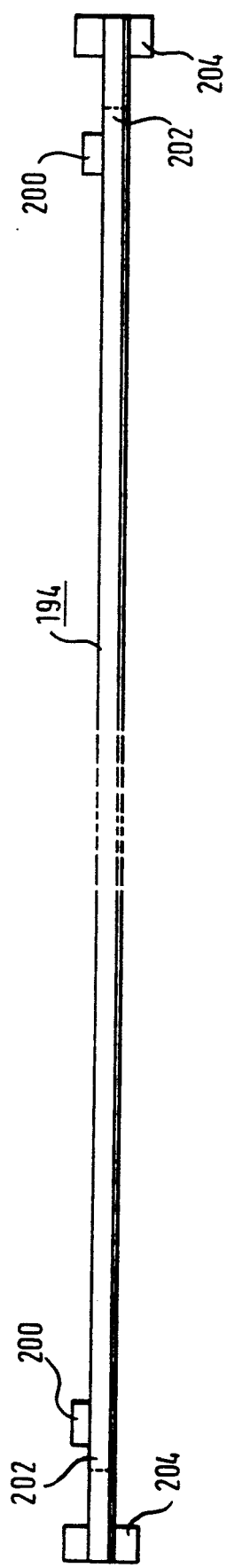
Fig. 26
Fig. 27

LINEAR BALL BUSH

This application is a continuation of application Ser. No. 07/424,874, filed on Oct. 20, 1989, now abandoned.

BACKGROUND OF THE INVENTION

The invention relates to a linear ball bush comprising a cage with a cage axis and having a plurality of ball circuits.

More particularly, this invention relates to a linear ball bush comprising a cage with a cage axis and having a plurality of ball circuits where each ball circuit comprises two straight ball rows substantially parallel to the cage axis, namely a carrier ball row and a return ball row, and two curved ball rows connecting the two straight ball rows. Each of the ball circuits rests radially outwardly on a runner plate which is inserted into a pertinent aperture of the cage and possesses an external surface to abut on an internal circumferential face of a bearing housing bore accommodating the cage. A closed track for the ball circuit in each case is formed on an inner surface of the runner plate. The closed track comprises two straight track sections, namely a carrier straight track section for the carrier ball row and a returning straight track section for the returning ball row, and two curved track sections connecting the straight track sections.

In relation to the outer face of the runner plate, the carrier straight track section lies at a higher level, in relation to the outer surface of the runner plate, the returning straight track section lies at a lower level, and the curved track sections gradually overcome the corresponding differences of level. The straight track sections are separated from one another by a middle rib. The carrier ball row in each case partially radially inwardly penetrates a slot of the cage, in order to be able to abut on a shaft enclosed by the cage, and the return ball row in each case is radially inwardly supported by the cage.

DE-AS-1,287,382 discloses a linear ball bush having an embodiment wherein the runner plate is formed as an annular shell with the straight track sections converging in extension upon a shell edging. In this embodiment, a prerequisite provided from the basic geometry is for steady ball guidance extending over the whole ball course, which could guarantee an impact-free running of the balls. On the other hand, the machining of the straight track sections—especially the carrying straight track section which requires careful machining—is made more difficult by the fact that the straight track sections meet with the shell edge with their imaginary prolongations.

DE-OS 2,003,535 discloses a runner plate which comprises only the carrying straight track section adjoined by partial arcs of curved track sections. The runner plate possesses no returning straight track section intersecting with the pertinent partial arcs of the curved track sections and accordingly no distinct rib to continue the carrying straight track section as far as the ends of the runner plate. Thus, the complete guidance of the balls on the track plate is not achieved over the entire ball circuit.

DE-OS 3,512,013 discloses a runner plate for linear ball bushes wherein the inner surfaces of the two straight track sections are separated from one another by a middle rib. The middle rib ends at respective distances from the ends of the runner plate. In each case, faces are formed between the end of the middle rib and the pertinent end of the runner plate plane which are parallel to the plane defined by the ball center points of the ball circuit. Thus, all lateral guidance of the balls in the region of the curved track sections is excluded. According to the disclosure of DE-OS 3,512,013, the necessity of a precise mutual adaptation of lateral guidance in the cage and lateral guidance in the runner plate is avoided in the region of the curved track section in each case.

It is an object of this invention to provide a linear ball bush having a configuration of its runner plate which, while maintaining the most complete possible ball guidance over the entire ball circuit, facilitates the machining of its straight track sections and especially of its carrying straight track section.

SUMMARY OF THE INVENTION

According to this invention, a linear ball bush comprises a runner plate having a middle rib which is continued to the ends of the runner plate substantially with constant section (i.e. continuations) and is traversed by curved track sections. Prolongations of the two straight track sections are continued with substantially constant section as far as the ends of the runner plate, intersecting with the curved track sections.

With the formation of the runner plate in accordance with this invention it is possible to work, and especially grind, the straight track sections continued with substantially constant profile as far as the ends of the runner plate, especially with respect to the carrying straight track section, with conventional surface treatment methods. The parallelism of the two track sections here permits, if desired, grinding both straight track sections in common with a single grinding tool. Due to the fact that the middle rib is traversed by the curved track sections, the guidance of the balls is maintained over the major part of the ball circuit, particularly in the apex of the ball circuits.

It has been found that this invention provides extensive lateral guidance of the balls even in the region of the curved track sections and especially in the partial zones thereof adjoining the carrying track sections, approximately as far as the apex of the respective curved track section. This has been found advantageous for the length of life and smooth running of the ball course, thus providing a ball course without appreciable friction force fluctuations, and advantageously the increased precision demands in the mutual adaptation of cage and track plates should be tolerated.

In this invention, the runner plates can be milled fundamentally from the solid by a relatively simple mechanical machining, thanks to the constancy of profile. An especially simple possibility for the preparation of the runner plate blanks is due to the constancy of profile in the form of the extrusion of a metal blank or a power-metallurgical loose material heap. In the blanks thus obtained the curved track section can be formed by swaging.

Due to the fact that the middle rib is traversed by the curved track sections, that is rises to both sides of the curved track sections at least in their apex region, lateral guidance of the balls is guaranteed in the apex region of the curved track sections.

According to a preferred embodiment of the invention, it is provided that the drop in track level from the carrying straight track section level to the returning straight track section level begins in each case in the region of the rectilinear end continuations of the carrying straight track section. Thus, on the whole of the arc of the curved track section, which extends over about 90° from the end of the carrying straight track section to the apex of the curved track section in each case, considerable lateral guidance of the balls is obtained, despite the continuation of the straight track section to the respective runner plate end, due to the fact that the floor of the curved track section in this part of the curved region lies entirely lower than the floor of the continued straight track section.

The drop in level existing in the region of a rectilinear end continuation of the carrying straight track section can naturally also be obtained by the swaging working which is applied for the formation of the curved track section. By this measure, moreover, an especially smooth onset of the level drop is achieved, which is important for running smoothness.

It is further possible for the track to run through a minimum level in each case in the transition region between the curve lengths of the curved track sections and the return straight lines of the returning straight track sections. Thus, a certain lateral guidance of the balls is achieved in the part arc region of a curved track section which extends from its apex to the returning straight track section, especially if, according to a further development, it is provided that the track rises gradually in the region of the rectilinear end continuations of the returning straight track section from the minimum level in each case to the level of the returning straight track section.

It has appeared in this invention that despite the presence of a minimum level, the running smoothness is not reduced, but improved. While not wishing to be bound by any one theory, this may be attributable to the fact that the transition from the swaged curved track section to the straight track section, when not achieved in accordance with this invention, comes to lie in the return straight line and therefore cannot be made sufficiently smooth, even if grinding of the returning straight track section takes place after the swaging.

With regard to the most exact possible ball guidance, which again is responsible for smoothness of running, it is preferred that the straight track sections and/or curved track sections possess a channel cross-section the radius of curvature of which is approximately equal to, preferably slightly greater than, the ball radius.

In order to impart a degree of angular adaptation play to the shaft guided by the linear ball bush, it is proposed that the runner plates rest in a swinging manner on the inner circumferential surface of the bearing housing bore accommodating the cage, namely about an axis of swing which lies in a plane perpendicular to the cage axis, approximately tangentially of the cage axis, most preferably in the region of the middle of the length of the ball bush. In the case of hard-elastic case material it is advisable, in view of the swing capacity, to mount the runner plates with movement play in the cage. In the case of soft-elastic cage material, the swing capacity may also be derived due to the elastic deformability of the cage material. The simplest manner of obtaining the swinging abutment on the inner circumferential surface of the bearing housing bore is by having the outer surface of the runner plate fall off, from a middle region placed in the region of the axis of swing, to the ends of the runner plate, in a radially inward direction in relation to the cage axis.

This invention further relates to a method for the production of a runner plate for the ball bush. This method consists of the following steps:

a) a profiled bar is prepared which possesses an outer surface and an inner surface, where on the inner surface two mutually parallel straight channels extending in the longitudinal direction of the profiled bar and separated from one another by a middle rib are formed, where one of these straight channels possesses a higher level compared with the outer surface, and the other straight channel possesses a lower level compared with the outer surface; and b) curved channels are impressed into the inner side of the runner plate, the channels traversing the middle rib and connecting the straight channel of higher level with the straight channel of lower level to overcome the level difference.

The preparation of the profiled bar can here take place according to one of the method as described further above.

At least one of the straight channels can be ground after the impression of the curved channels, it being understood from the above that it is particularly preferred that the channel which produces the carrying track section is ground, that is the straight channel of higher level.

In order to obtain a lateral guidance of the balls even in the parts of the curved track sections adjoining the returning straight track section, it is preferred that the depth of impression of the curved channels in the regions adjoining the straight channel of lower level is so selected that level minima occur there and may still be present even after the grinding of the straight channel of lower level.

In order to render possible the impression of the curved channels without the runner plate material flowing away in an uncontrolled manner, it is proposed that the ends of the profiled bar apertures be prepared so that the swaging accommodates at least a part of the runner plate material which is displaced. In this case swaging tools can be used which are adapted to the form of the profiled bar, including the aperture. Thus, the form is completely filled after swaging has taken place, so that thus defined edges and faces are produced even in the region of the aperture.

The outer face can be ground before or after the grinding of the straight channels; in one embodiment so that the swinging capacity occurs. It is especially preferred that the outer surface be ground after the grinding of the straight channels, with the ground straight channels being used for the positioning of the profiled bar in the grinding of the outer surface.

The invention further relates to a linear ball bush, comprising a cage having a cage axis and a plurality of ball circuits, where each ball circuit comprises two straight ball rows substantially parallel to the cage axis, namely a carrier ball row and a return ball row, and two curved ball rows connecting the two straight ball rows. At least the carrier ball row of a ball circuit rests radially outwards on a runner plate which is inserted into a pertinent aperture of the cage, and possesses an outer surface for abutment on an inner circumferential face of a bearing housing bore accommodating the cage. On an inner face of the runner plate a straight track section is formed at least for the carrier ball row of the ball circuit in each case and the respective carrier ball row radially inwardly penetrates a slot of the cage, in order to be able to abut on a shaft enclosed by the cage.

In contrast to known forms of runner plates, where the runner plates possess in the middle of their length a tilt bearing of apex form, or are made constantly spherically domed over their entire length on their outside, it is here proposed that the runner plate has on its outer surface a middle region which extends parallel to the track of the carrier ball row and that this middle length region is adjoined, by way of radially outwardly convex roundings, by axially outer length regions which extend preferably rectilinearly axially outwards and radially inwards. Such a configuration, on account of the lower pressure per unit area in the region of the axially middle length section, is more stable to elastic or plastic deformations and especially to wear phenomena, than the known forms of runner plates. Nevertheless a tilting capacity is retained.

It is especially preferred that the axial overall length of a carrier ball row amounts to about 100% to about 200%, preferably about 130% to about 180% of the pertinent shaft diameter, that the axial length of the middle length region amounts to about 2% to about 15% of the pertinent shaft diameter, preferably about 5% to about 10% of the pertinent shaft diameter, that the rounding possesses a radius of curvature which amounts to more than 100%, preferably more than 150%, for example 167% to 300%, of the pertinent shaft diameter, and that the inclination of the axially outer length regions in relation to the track of the carrier ball row amounts on average to about 25 to about 45 minutes of angle, preferably about 35 minutes of angle.

This dimensioning is especially favorable because the approach of mutually opposite carrier ball rows, which unavoidably occurs due to any loss of alignment of the shaft in relation to the bore accommodating the linear ball bearing (resulting from the rectilinearity of the longitudinal middle sections) remains within acceptable limits, so that the pressure per unit area of the balls against the shaft and against the inner faces of the runner plates remains within acceptable limits.

The axial rectangularity of the middle longitudinal sections of the runner plate outer faces is also usable when only the carrier ball rows are guided radially outwards by the runner plates, and the return ball rows are guided elsewhere within the cage.

The bearing mounting of runner plates on their outer surface is disclosed in DE-PS 1,949,182 and DE-OS 3,507,760. the linear ball bush described in DE-PS 1,949,182 shows runner plates which rest only with linear contact on the bearing housing bore, so that high pressure per unit area is to be expected.

In case of the linear ball bush as described in DE-OS 3,507,760, the runner plates are mounted on their outer surface by impressions of an enveloping jacket. This enveloping jacket leads to an undesired enlargement of the external diameter, which can be compensated at most by thin runner plates or small balls. In the formation in accordance with this invention, an enveloping jacket is not necessary. Instead, the linear ball bush can be inserted into the bearing housing bore so that the runner plates rest directly on their internal circumferential surface.

BRIEF DESCRIPTION OF THE DRAWINGS

The accompanying Figures explain the invention by reference to examples of various embodiment.

FIG. 7 represents an enlargement of an end section of the runner plate according to FIG. 3;

FIG. 8 represents a section along the line VIII—VIII in FIG. 7;

FIG. 9 represents a section along the line IX—IX in FIG. 7;

FIG. 10 represents a section along the line X—X in FIG. 8;

FIG. 11 represents a section along the line XI—XI in FIG. 8;

FIG. 26 represents a partial view, partially in section, in the direction of the arrow XXVI in FIG. 22;

FIG. 27 represents a longitudinal sealing strip as employed in FIG. 26; and

DESCRIPTION OF THE PREFERRED EMBODIMENT

Figure 1:
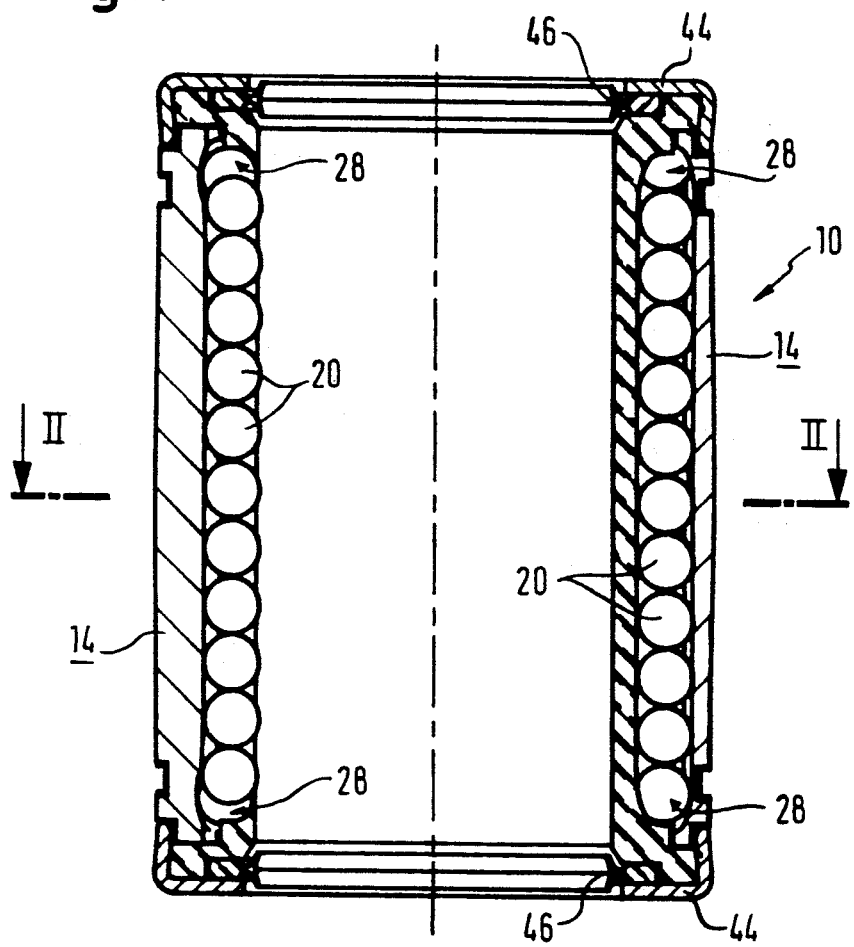
FIG. 1 represents a longitudinal section through a linear ball bush according to the invention.
Figure 2:
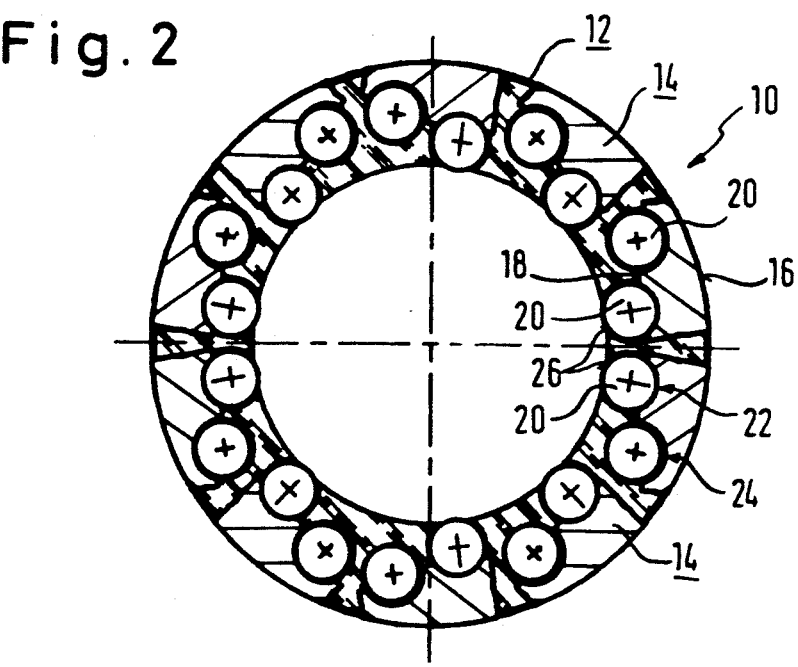
FIG. 2 represents a cross-section along the line II—II in FIG. 1.

In FIG. 1 and 2 a linear ball bush is designated generally by 10. It includes a cage 12 of hard-elastic synthetic plastic material. Into this case 12 there are inserted runner plates 14, each possessing an external circumferential face 16 for abutment on a bearing housing bore receiving the linear ball bush 10, and an internal circumferential surface 18. The runner plates 14 consist of a hard material, preferably hardened steel. A guide is formed for a ball circuit by the case 12. The balls are designated by 20. Each ball circuit forms a carrier ball row 22 and a return ball row 24. The carrier ball rows 22 extend through slots 26 of the cage 12 radially inwards to abut on a shaft (not shown). The return ball rows 24 are radially inwardly supported by the cage 12. Both straight ball rows 22 and 24 lie against the inner circumferential surface 18 of the respective runner plate 14. The carrier ball row 22 and the return ball row 24 are in each case connected by curved ball rows 28. The runner plates 14 are held in shape-engaging manner in the cage 12, but have a certain degree of free movement or play.

Figure 4:
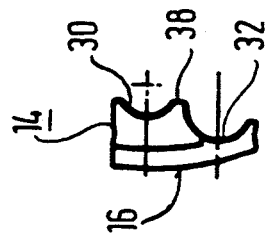
FIG. 4 represents an end view of a runner plate according to FIG. 3.
Figure 6:
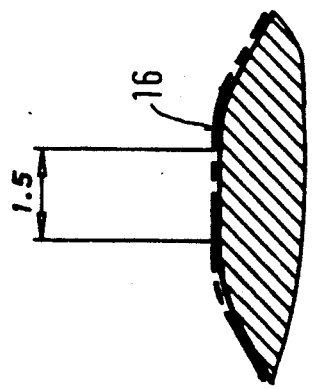
FIG. 6 represents an enlargement of the zone VI in FIG. 5, in a section corresponding to that in FIG. 5.
Figure 3:
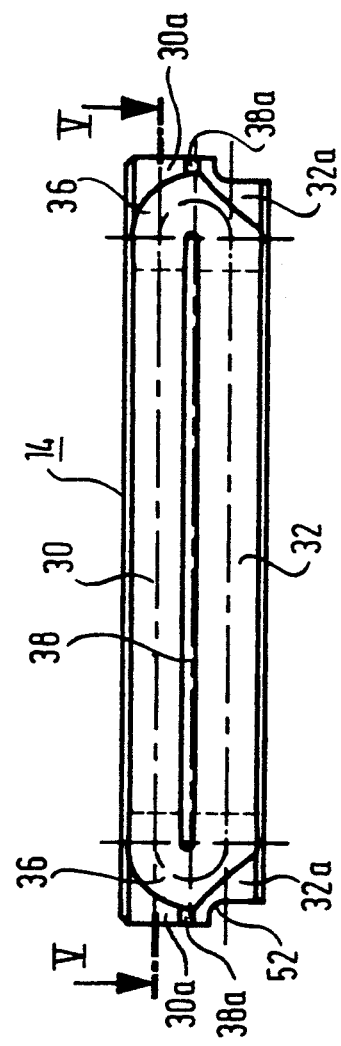
FIG. 3 represents a view of the inner side of a runner plate.
Figure 5:
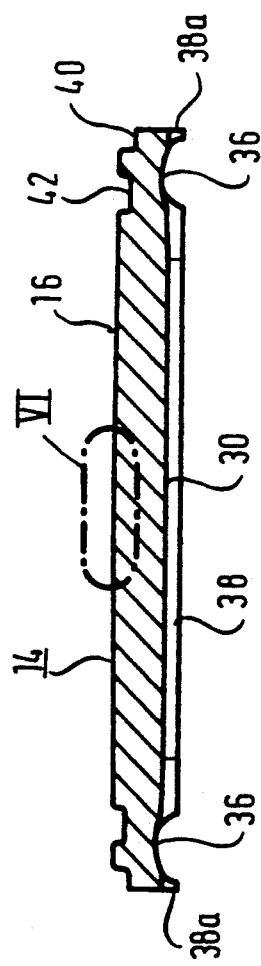
FIG. 5 represents a section along the line V—V in FIG. 3.

In FIGS. 3, 4 and 5 a runner plate 14 is illustrated individually. This runner plate 14 is produced from a profiled bar, the profile of which can be seen from FIG. 4. The runner plate 14 comprises a carrier straight track section 30 having a first higher level in relation to the external circumferential surface 16, and a returning straight track section 32, which possesses a lower level in relation to the external circumferential surface 16. The carrier track section 30 serves to receive the carrier ball row 22 and the straight track section 32 serves to receive the return ball row 24. The two straight track sections 30 and 32 are connected with one another by curved track sections 36. However the straight track sections 30 and 32 extend by means of the respective end sections 30a and 32a to provide substantially constant profile as far as the ends of the runner plate 14. Between the straight track sections 30 and 32 there lies a middle rib 38. The middle rib 38 is merely interrupted by the curved track sections 36, and continues by means of end sections 38a as far as the ends of the runner plate 14 to provide constant profile. At its external circumferential surface 16 the track plate is curved, as shown in FIG. 6, so that it comes to abut in swinging manner on the internal circumferential surface of a bearing housing bore. As may be seen from FIG. 4, the straight track sections 30 and 32 are rounded with a radius of curvature which may be equal to or slightly greater than the radius of the balls 20.

In FIG. 5, turned apertures 40 and 42 are seen at the ends of the runner plate. The turned apertures 40 are intended to receive pot-shaped end rings 44 (FIG. 1) which secure the runner plate 14 and closure washers 46 on the cage 12. The turned apertures 42 are intended to receive securing rings for the axial securing of the ball bush in a receiving bore.

Further details on the formation of the tracks appear from FIGS. 7 to 11. The curved track sections 36 extend over approximately 180° and are of nearly circular curvature. The drop in level from the straight track sections 30 to the straight track section 32 begins as early as the designated end section "a" in straight track section 30. Thus the floor of the curved track section 36 in the region of intersection with the straight track section 30 lies lower than an imaginary continuation of the floor of the straight track section 30, and material guidance of the balls is obtained in this intersection zone as well. The level gradient in the end section "a" is represented by the angle indication 2° in FIG. 8. The level gradient in the directly adjoining region of the curved track section 36 amounts to about 5°, as is likewise illustrated in FIG. 8. This, no jumps in level occur, and the gradient transitions are rounded. The longitudinal extent of the end section "a" is large enough, even after grinding, so that the loaded balls can be continuously relieved of load before entry into the curved track section 36. This is also the case for the balls entering the load zone. Thus, a uniform and jerk-free course is guaranteed. At the point 6 in FIG. 7 the curved tack 36 possesses a minimum level which lies below the level of the returning straight track 32. In the end section designated "b" of the returning straight track section 32, a slow rise of level takes place; thus, no jumps in level occur and the gradient transitions are rounded. The minimum level 6 is still present even after the grinding of the returning straight track section 32. The gradient distances "a" and "b" of the straight track sections 30, 32 are swaged together with the curved track sections 36. The tapering of the rib width of the middle rib 38 in the region of end sections "a" and "b" results in a funnel-shaped transition of the curved track section 36 into the straight track sections 30 and 32.

Figure 12:
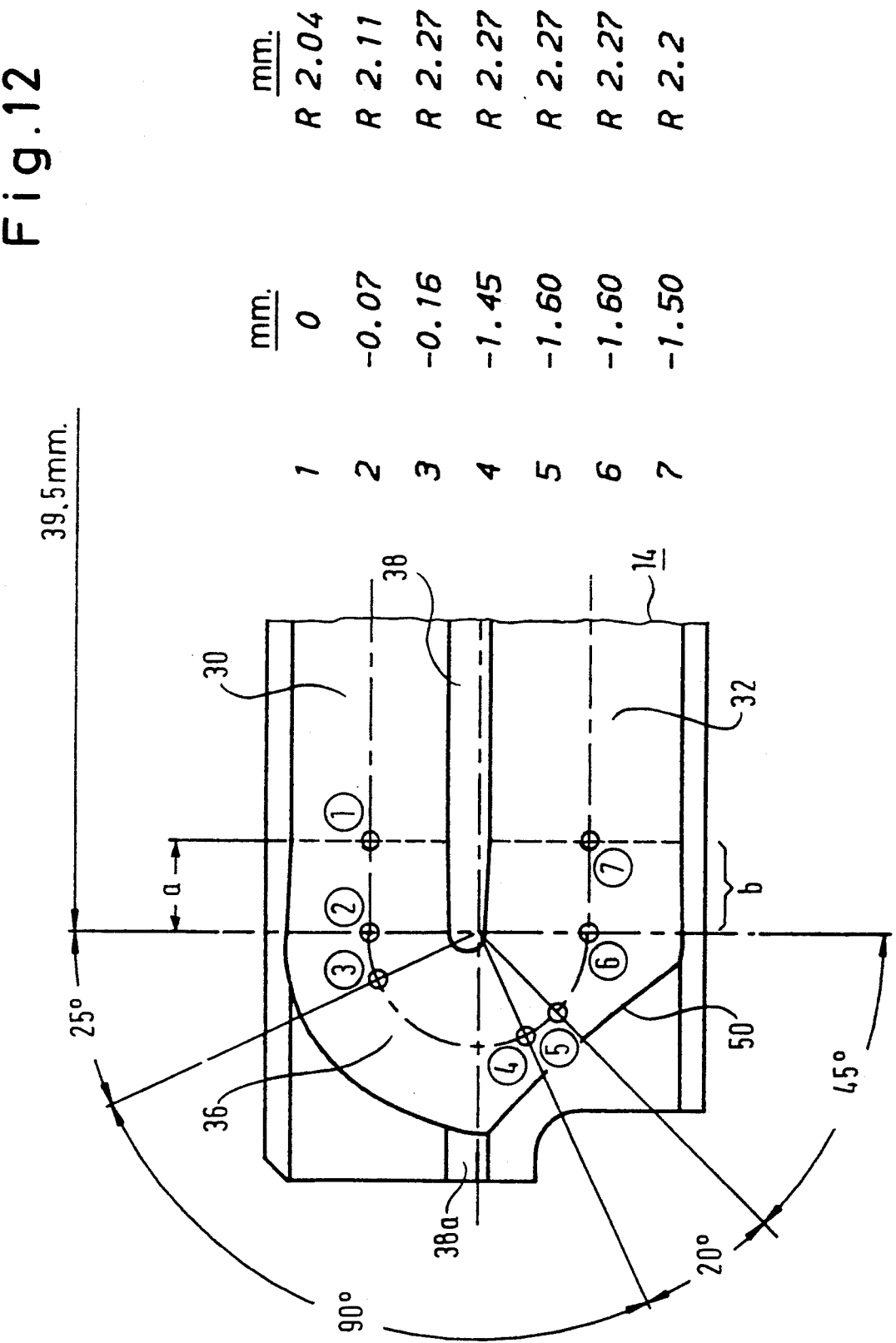
FIG. 12 represents a plan of levels with tabular listing of the floor level of the track in an end section of the runner plate according to FIG. 7.

In FIG. 12 different measurement points, some of which were also entered in FIG. 7 in order to clarify the relationships between FIG. 7 and FIG. 12, are designated by 1 to 7. Different level values are allocated to these measurement points, by way of example, according to the table in FIG. 12. The level values designate the relative level height in millimeters in each case on the floor of the track in relation to the floor level of the carrier track section 30, to which the value zero is allocated.

From the second column of the table it is readily seen that in the region 5 to 6 a minimum level is present, and that starting from this minimum level a level rise takes place to the height level of the floor of the returning straight track section 32. The level rise occurring form positions 6 to 7 lies substantially in the straight return line of the returning straight track section 32. Locus coordinates allocated to the individual points 1 to 7 are designated by the angle values in FIG. 12. The length statement of 39.5 mm in FIG. 12 indicates the order of magnitude of the length of the ball bush. Similarly, the external diameter of the cage 12 in the case of this example is 40 mm., and all 10 runner plates are provided, as represented in FIG. 2, so that the peripheral extent of a runner plate amounts to 9.7 mm. and the ball diameter amounts to 3.969 mm. Finally the radius of curvature of the track, measured at the floor (i.e. dot-and-dash line in FIG. 12) amounts to 2.04 mm, and in the table in the third column there are entered the radii in each case of the track sections in millimeters. It is seen that these radii are only slightly larger than the ball radius, so that the balls are laterally guided. It is seen from FIG. 12 and the table therein that in the region 1 to 4 lateral guidance is obtained; this lateral guidance is supplemented in the apex region 4 by the continuation 38a of the rib 38. Even in the relatively uncritical region 4 to 7 a certain lateral guidance of the balls by the runner plate is still obtained, as indicated by the intersection line 50. It should be noted that the individual gradient distances from 1 to 7 merge into one another in a substantially steady manner.

The guidance of the balls is supplemented by the cage 12. The guide faces in the cage 12 are manufactured with high precision so that they adjoin the guide faces of the runner plates without stagger.

The apertures 52 which can be seen in FIGS. 3 and 7 serve in part to receive material in the swaging of the curved track sections 36; in other words, in swaging the runner plates 14 are laid with previously formed apertures into swaging molds which rest on the external circumferential surface 16 and the end faces, but in the region of the apertures 52 leave so much clearance that the material displaced in swaging can flow in, and the geometry of the apertures according to FIG. 7 is produced.

Figure 13:
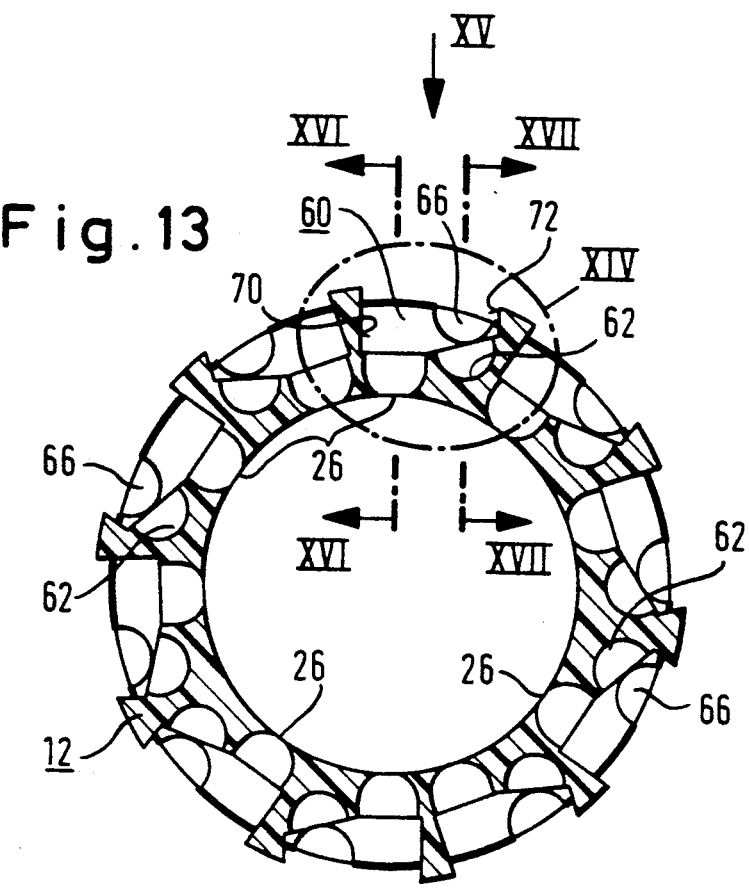
FIG. 13 represents a cross-section through a cage along line II—II in FIG. 1, but after removal of the runner plates and balls.
Figure 14:
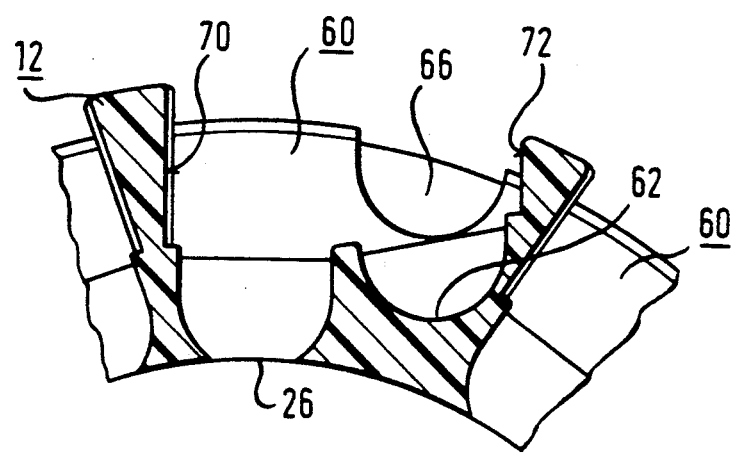
FIG. 14 represents a detail of FIG. 13 in enlarged form.
Figure 15:
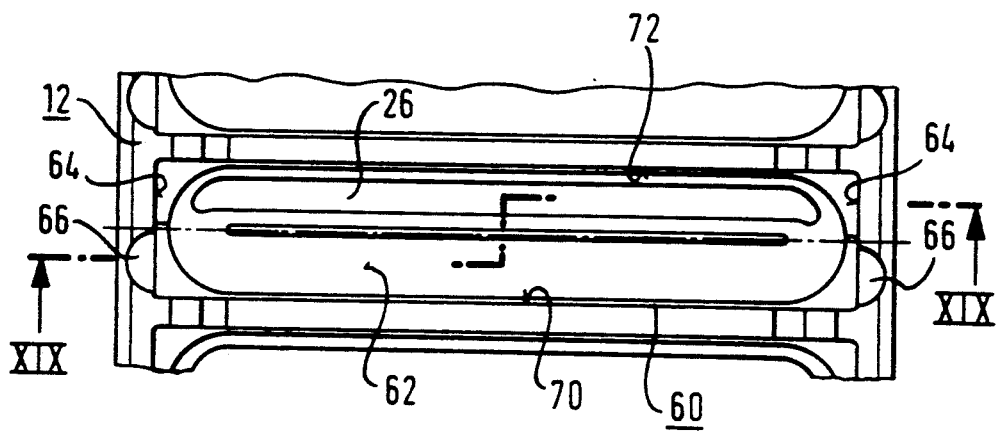
FIG. 15 represents a partial view of the cage in the direction of the arrow XV in FIG. 13.
Figure 16:
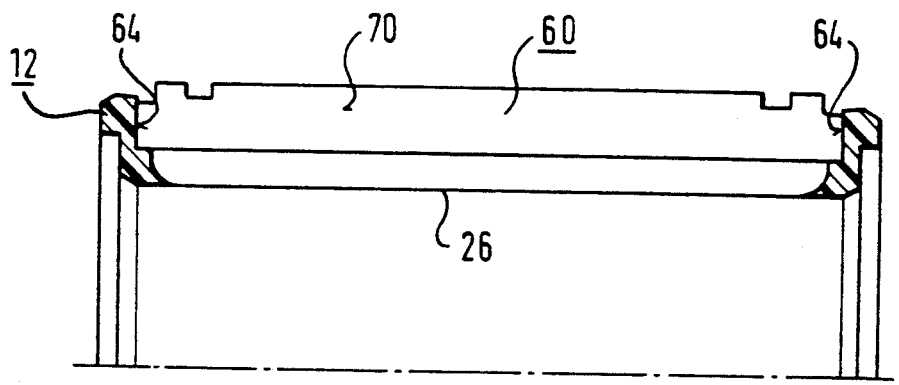
FIG. 16 represents a longitudinal section through the cage along the line XVI—XVI in FIG. 13.
Figure 17:
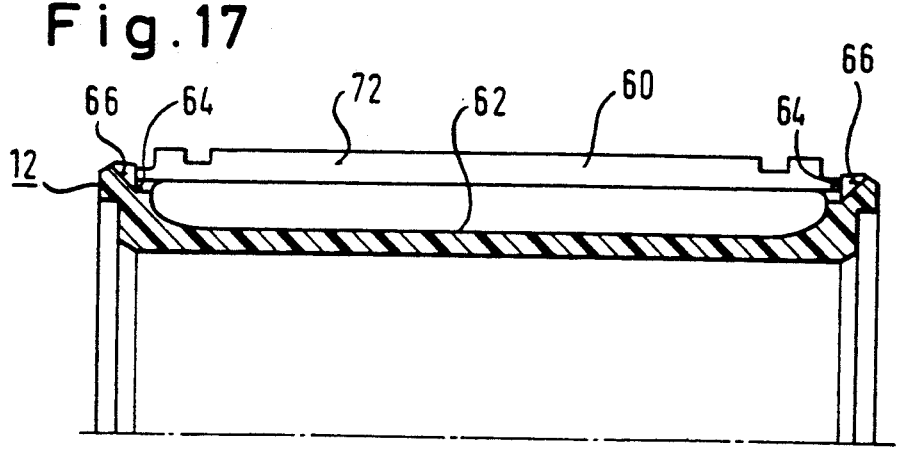
FIG. 17 represents a longitudinal section along the line XVII—XVII in FIG. 13.

In FIG. 13, the cage according to FIG. 2 is represented after removal of the runner plates 14 and the balls 20. The apertures 60 for the accommodation of the runner plates 14 from FIG. 2 are depicted, as well as the slots 26 which in part permit passage of the balls of the carrier ball row 22 and the track 62 for the return ball row 24 in FIG. 2. All this is represented in enlargement in FIG. 14 as well. FIGS. 14 and 15 further depict that at the ends of the apertures 60, namely adjoining the end faces 64 of the apertures 60, filling slopes 66 of channel form are arranged in alignment with the tracks 62. The significance of the slopes may be seen especially from FIG. 19, in which a filler pipe 68 is fitted for the charging of the balls 20 of a ball circuit, so that the pipe is approximately a continuation of the filling slope 66 in each case. In this case the upper pot-shaped end ring 44 is removed, while the lower pot-shaped end ring 44 assumes its securing position in relation to the runner plates 14. Since the upper end ring 44 is absent, the runner plate 14 can be set obliquely, as may be seen from FIG. 19, so that in the region of the entry slope 66 it permits admission of the balls 20. The oblique placing of the runner plates 14 is possible since the longitudinal defining faces 70, 72 of the aperture 60 are approximately parallel to one another. In the alternative, the synthetic plastics material of the cage 12 is elastic in such a way that a placing of the runner plate 14 under constraint is possible.

Figure 18:
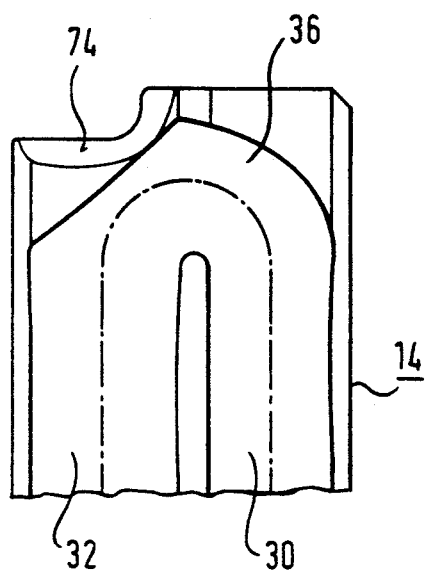
FIG. 18 represents a partial view of a runner plate according to FIG. 7, but with an end bevel.
Figure 19:
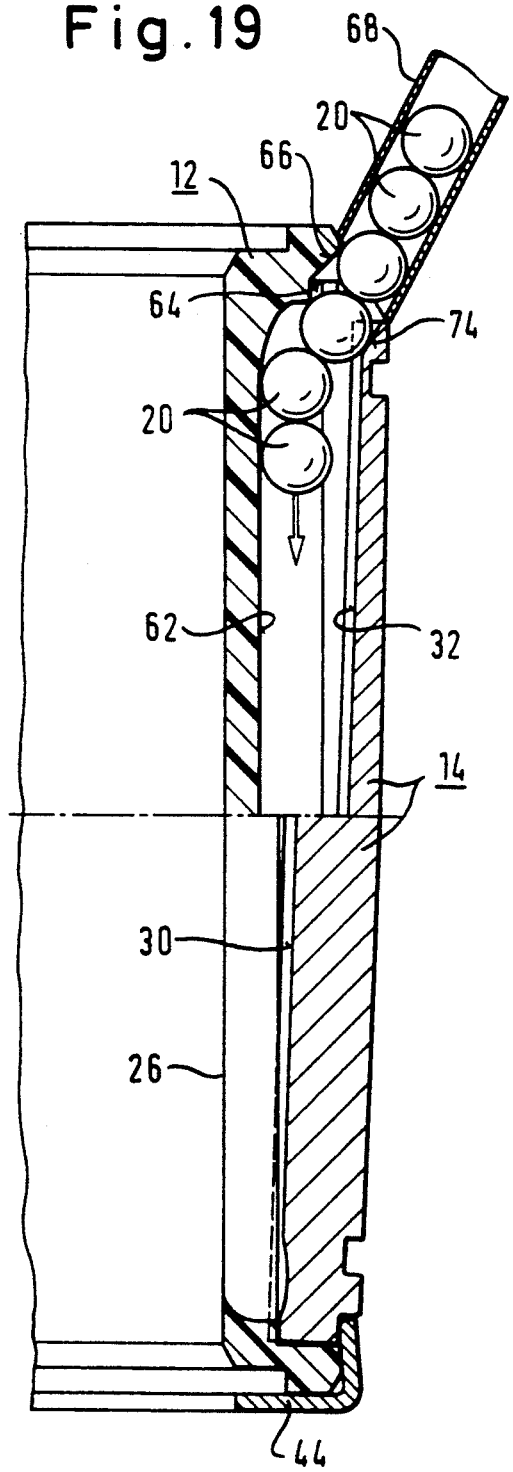
FIG. 19 represents a section along the line XIX—XIX in FIG. 15, in the charging of balls.

The charging of the balls 20 into the track 62 of the return ball row is also facilitated by the fact that a bevel 74 is provided on the inner side of the runner plate 14, as may be seen from FIGS. 18 and 19.

It should be remarked that the nature of the charging, using the filling slope 66 and the bevel 74, is not a function of the fact that the two straight track sections 30, 32 and the curved track sections 36 are provided on the runner plate 14. The manner of filling would still be conceivable even if the runner plates 14 were limited to the width of the straight track sections 30 of the carrier ball rows. In this case only the filling slopes 66 and the bevels 74 would have to be provided in alignment with the respective straight track section 30 of a carrier ball row.

Figure 20:
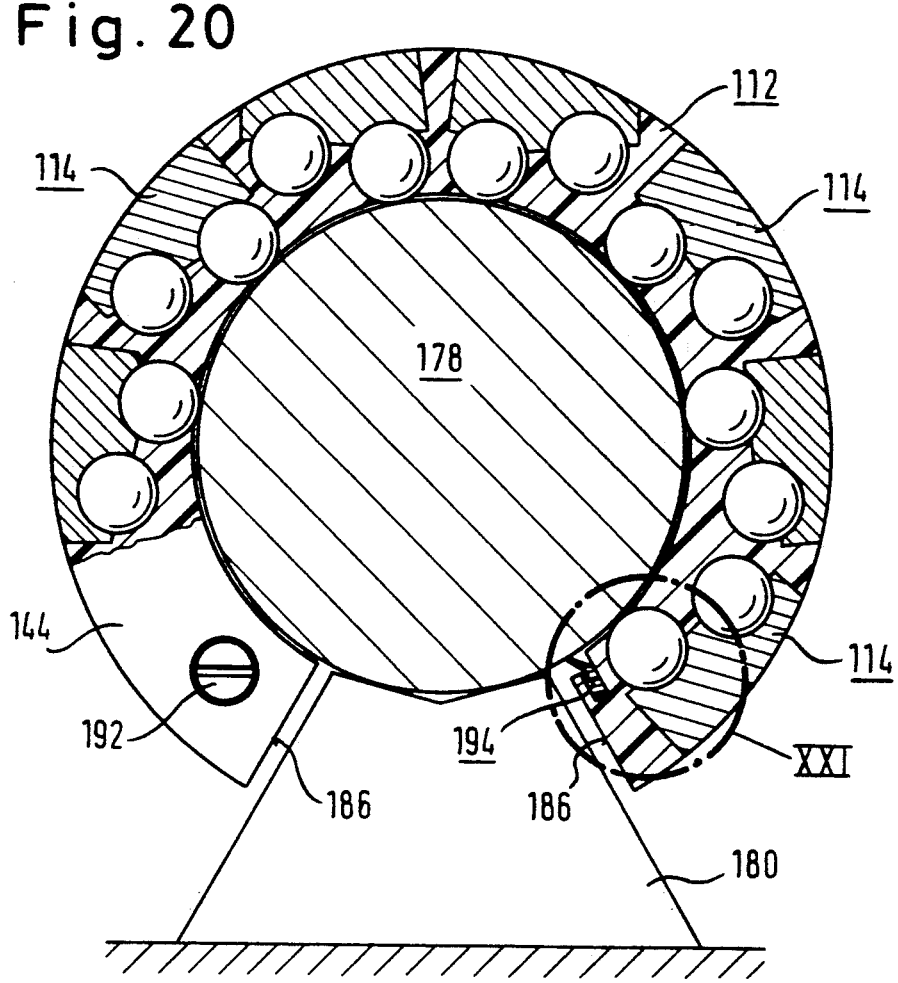
FIG. 20 represents a section through a linear ball bearing according to FIG. 1, but modified in that the cage is made in partial ring form for the reception of a support for the shaft.
Figure 21:
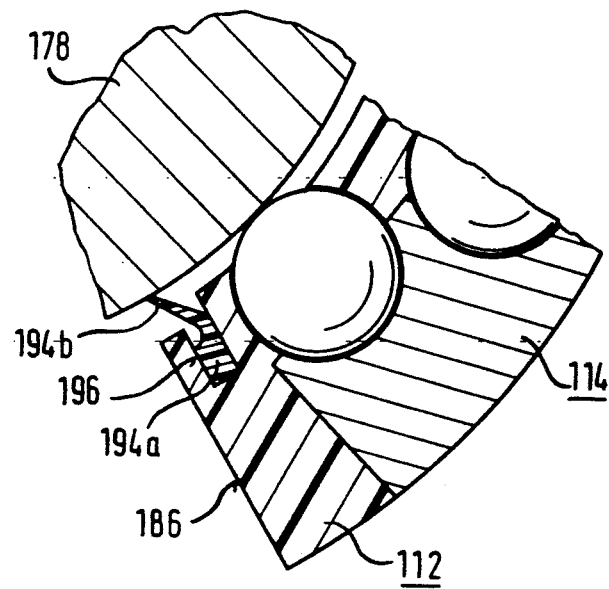
FIG. 21 represents a detailed view corresponding to point XXI in FIG. 20, in enlargement.
Figure 22:
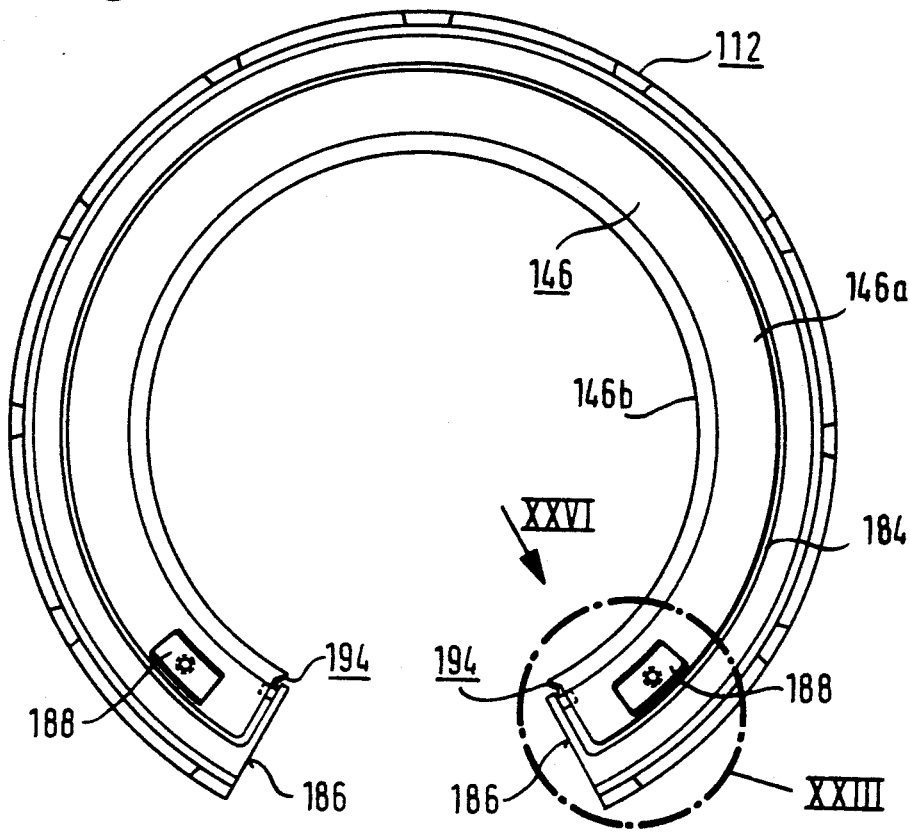
FIG. 22 represents an end view of a linear ball bearing according to FIG. 20, where a likewise part annular, pot-ring-shaped end ring is removed.

In FIG. 20, there is depicted a linear ball bearing in which the shaft 178 is supported by pedestals 180 and the cage 112 is made in part-annular form. The cage is again provided at its ends with end rings 144 which are made in part-annular form in accordance with the circumferential extent of the cage 112. Seals are provided to prevent the penetration of dirt into the region of the balls.

In FIG. 1, the closure washers 46 were indicated. These are the necessary sealing rings which are held on the cage by end rings 44 and come to abut against a sealing lip on the shaft (not shown there). These sealing rings are also needed in the embodiment depicted according to FIG. 20, and these sealing rings are also seen in FIGS. 22 to 25, where they are designated by 146 and are composed in each case of a basic body 146a and a sealing lip 146b. The sealing lip 146b is intended to abut against the shaft 178 according to FIG. 20. The basic body 146a of the sealing ring 146 is accommodated, as may be seen especially from FIG. 25, in an annular recess 184, which is defined by an axially directed face 184a and a radially inwardly directed face 184b. The basic body 146a has axial movement or play and lies between the axially directed face 184a of the cage 112 and an axially directed face 144a of the end ring 144. The oversize of the aperture 184 compared with the diameter of the basic body 146a (FIG. 25) permits the basic body 146a radial movement or play within the aperture 184. This radial movement or play also exists in the embodiment according to FIG. 1, and is of importance. This radial play is necessary in order to render possible an adaptation of the sealing ring 146 to the altered geometry resulting from a displacement in angle of the shaft 178 in relation to the cage 112. In an embodiment according to FIGS. 1 to 13, the sealing ring 46 (there called closure washer) is closed in circular form and therefore can be movable in the peripheral direction without interfering with the bearing operation, whereas in accordance with this invention the sealing rings 146 are of part-annular form, that is open. The necessity still exists to permit radial movement or play to the sealing rings 146, in order to render possible their adaptation to modified bearing geometry in the case of loss of alignment between shaft 178 and cage 112. However the simultaneous necessity exists of avoiding a twisting of the sealing rings 146, since these sealing rings 146, in the case of twisting, could protrude beyond the one or other end face 186 of the cage (see FIG. 22) or recede behind it.

Figure 23:
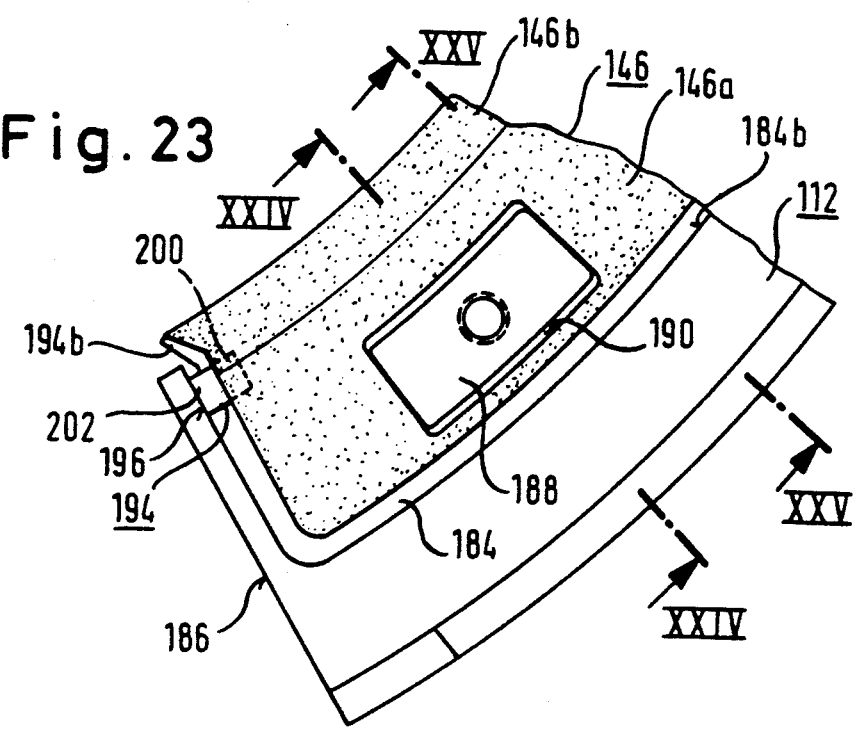
FIG. 23 represents an enlargement of the detail XXIII in FIG. 22.
Figure 24:
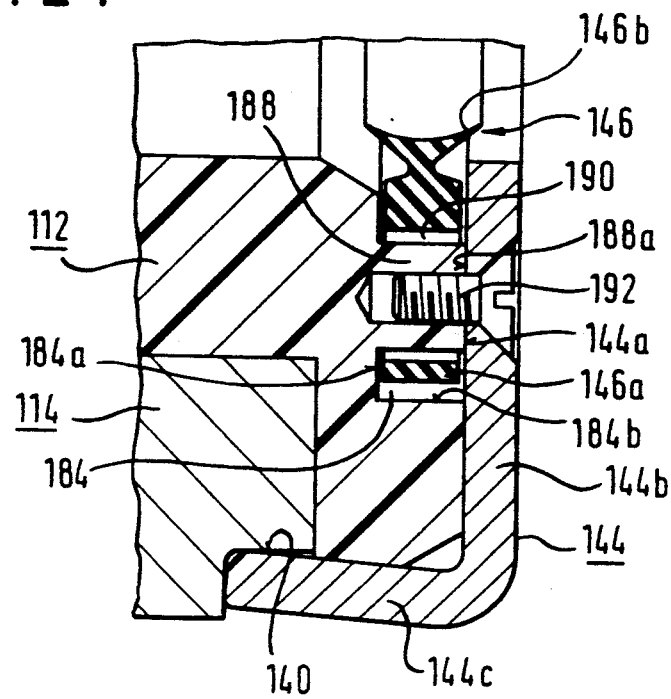
FIG. 24 represents a section along the line XXIV—XXIV in FIG. 23.
Figure 25:
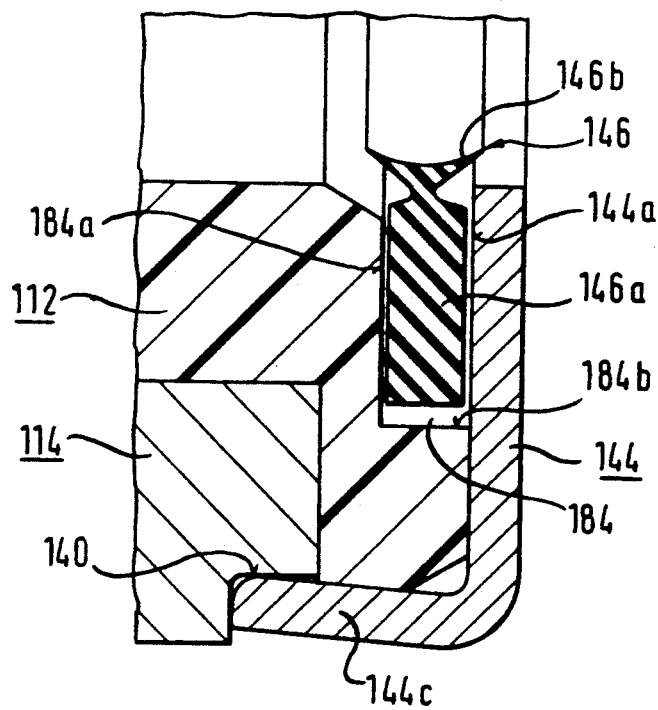
FIG. 25 represents a section along the line XXV—XXV, in FIG. 23.

In order to leave the sealing ring 146 movable in the radial direction, but to make it fixed in the peripheral direction, an embodiment is represented in detail in FIGS. 23 and 24. Above the axially directed surface 184a there rise dogs 188 which can also be seen in FIG. 22 and 23. These dogs 188 pass through piercings 190, as may be seen from FIGS. 23 and 24. Here the piercings 190 have a radial dimensional excess over the radial width of the dogs 188, so that the sealing rings 146 again have a radial movement or play, as before. It is here to be noted that according to FIG. 22 the dogs 188 are fitted only in the end zones of the sealing ring 146, that is close to the support bearings 180 in FIG. 20. It is further to be noted that the height of the dogs 188 opposite to the axially directed face 184a of the cage 112 is greater than the axial thickness of the basic body 146a in each case. The face 144a, that is the inner side of the pot bottom 144b of the pot-shaped end ring 144 lies against the end face 188a of the dog 188 in each case and is there screwed to the cage. The screw connection takes place by means of a countersunk screw 192 which is screwed into the dog 188. On account of the greater size of the axial height of the dog 188 compared with the axial thickness of the basic body 146, even when the countersunk screw 192 is fully tightened, the basic body 144a is not clamped in between the faces 184a and 144a. Thus, the radial movement or play of the sealing ring 146 is maintained. According to FIG. 24 it may also be recognized that the annular wall 144c engages in the turned recesses 140 of the runner plates 114 and also in corresponding turned recesses of the cage 112, so that the runner plates 114 are held axially and radially in the cage.

The sealing problem is not yet solved with the annular seals 146 alone. As may be seen from FIGS. 20 to 23, 26 and 27, in the region of the gap limitation, faces 186 in the cage 112 there are also provided longitudinal sealing strips 194 with a root part 194a and a tongue part 194b resting on the shaft 178.

The root part 194a is inserted in an axially extending and radially inwardly open groove 196 of the cage 112 close to its gap defining face 186 in each case. The grooves 196 extend in each case as far as the axially directed faces 184a and are peripherally widened in their end sections designated "e", so that support shoulders 198 are formed (FIG. 26). The root parts 194a of the longitudinal sealing strips 194 comprise peripherally protruding projections 200 in the axial end zones, which rest against the support shoulders 198. The longitudinal sealing strips 194 possess continuations 202 which protrude beyond the projections 200 axially in the direction towards the bottom wall 144b of the end ring 144, so that, as represented in FIG. 23, the sealing ring 146 comes to abut on the continuation 202. Due to the mutual abutment of the continuations 202 and the sealing rings 146 in the region of the gap 184-186, the interspace between the shaft 178 and the cage 112 is completely sealed.

FIG. 27 shows the longitudinal sealing strip 194 before assembly. Axially outside the projections 200 grip elements 204 are fitted on the two ends of a longitudinal sealing strip 194, the grip elements rendering it possible, in the fitting of the longitudinal sealing strips 194, to stretch their sections placed between the projections 200 so that the projections 200 can be pushed forward over the shoulder faces 198 and supported on these. After assembly has taken place, the grip elements 204 are cut away outside the continuations 202, with the continuations 202 being left.

In FIG. 28 there is again seen a runner plate 14, the outer face 16 of which has already been indicated diagrammatically in FIG. 6. The outer face 16 comprises a middle rectilinearly extending longitudinal section designated "f", which is adjoined, by way of transitional curvatures designated "g" with a radius designated "g1" of curvature in each case, by an axial longitudinal section designated "h", which is likewise rectilinear. The longitudinal section "h" includes with the longitudinal section "f" an angle of 35 minutes. The total length of the carrying ball row is designated by "i". With respect to the size ratios, the length "i" of the carrier ball row is about 100% to 200%, preferably about 130% to about 180% of the diameter of the shaft 178; the length of the middle longitudinal section "f" is about 2% to about 15%, preferably about 5% to about 10% of the diameter of the shaft 178; the radius "g1" of curvature of the transitional rounding "g" is more than about 100%, preferably more than about 150%, for example 167% to 300% of the diameter of the shaft 178. The angle inclination is about 25 to 45 minutes of angle, in the case of the example about 35 minutes of angle.

Figure 28:
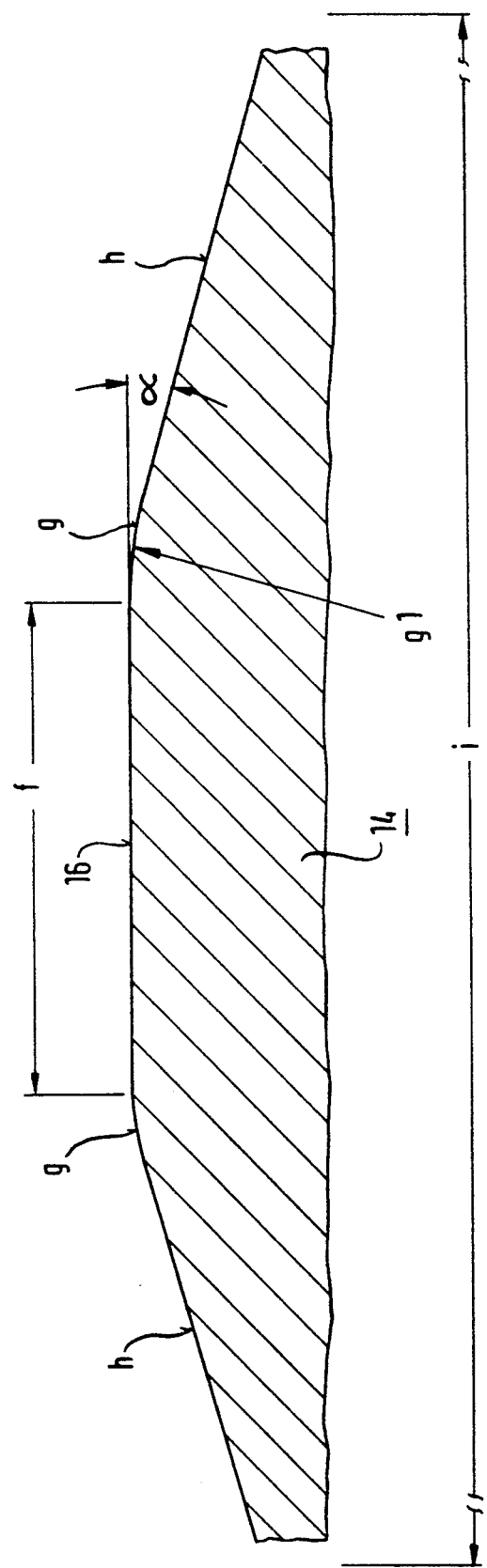
FIG. 28 represents an illustration of the runner plate according to FIG. 6.

It has been observed that if the stated dimensions are maintained a certain capacity for tilt or swing of the runner plates 14 is guaranteed, although in normal operation due to the rectilinearity in the middle length region "f" the pressure per unit area compared with a surrounding bearing bore is reduced to such extent that the wear remains low. It has further been observed that if the stated dimensions are maintained, in the range of the tilting movements to be expected in the case of loss of alignment between shaft axis and cage axis, the approach of diametrically mutually opposite runner plates 14 remains within acceptable limits and thus so does the pressure which the balls exert against the shaft 178 for one part and against the runner plates 14 for the other part. The embodiment of the runner plates according to FIG. 28 is as described above and also usable in all embodiments of the linear ball bearing of this invention.

It is to be noted that the runner plates are rounded on their outer surface 16, as represented in FIG. 2, in conformity with the internal circumferential surface of a receiving bearing housing bore, so that a flat abutment of the runner plates in the region of the middle longitudinal section "f" on the bearing housing bore is guaranteed.

We claim:

1. Linear ball bush (10) comprising a cage (12) with a cage axis and having a plurality of ball circuits, where at least one ball circuit comprises two straight ball rows (22, 24) substantially parallel to the cage axis, namely a carrier ball row (22) and a return ball row (24), and two curved ball rows (28) connecting the two straight ball rows (22, 24), where at least one of the ball circuits rests radially outwardly on a runner plate (14) which is inserted into a respective aperture of the cage (12) and possesses an external surface (16) to abut on an internal circumferential face of a bearing housing bore accommodating the cage (12), a closed track (30) for the respective ball circuit is formed on an inner surface (18) of the runner plate (14), the closed track (30, 32, 36) comprises two straight track sections (30, 32), namely a carrier straight track section (30) for the carrier ball row (22) and a returning straight track section (32) for the returning ball (24), and two curved track sections (36) connecting the straight track sections (30, 32), the carrier straight track section (30), in relation to the outer face of the runner plate (14), lies at a higher level and the returning straight track section (32), in relation to the outer surface (16) of the runner plate (14), lies at a lower level, and the curved track sections (36) gradually overcome the corresponding differences of level, the straight track sections (30, 32) are separated from one another by middle rib (38), and the respective carrier ball row (22) partially radially inwardly penetrates a slot (26) of the cage (12), in order to be able to take abutment on a shaft enclosed by the cage (12), and the respective return ball row (24) is radially inwardly supported by the cage (12), the middle rib being continued to the end of the runner plate (14) beyond the two curved track sections (36), substantially with constant profile, said middle rib (38) being traversed by the curved track sections (36) such that said middle rib (38) is subdivided by said curved track sections (36) into a middle portion between said curved track sections (36) and two continuation portions (38a) between each of said curved track sections (36) and the respective ends of the runner plate (14), said two straight track sections (30, 32) having a continued substantially constant profile to the ends of the runner plate (14) beyond the two curved track sections (36), and said curved track sections (36) intersect with said continued profile of said straight track sections (30, 32) such that prolongations (30a, 32a) of the straight track sections (30, 32) having profiles substantially identical with those of the straight track section (30, 32) are located adjacent to the respective continuation portions (38a) of the middle rib.

2. Linear ball bush according to claim 1, characterised in that the curved track sections (36) are formed by swaging.

3. Linear ball bush according to claim 1, characterised in that of the straight track sections (30, 32) at least the carrying straight track section (30) is ground.

4. Linear ball bush according to claim 1, characterised in that the level drop (1-2) of the track from the level of the carrying straight track section (30) in the direction towards the level of the returning straight track section (32) begins in the regions of rectilinear end continuations (a) of the carrying straight track section (30).

5. Linear ball bush according to claim 1, characterised in that the track runs through a level minimum (5-6) in a transition zone between a terminal portion of a curved track section (36) and a respective terminal portion of the respective returning straight track section (32).

6. Linear ball bush according to claim 5, characterised in that the track gradually rises, in the region of rectilinear end continuations (b) of the returning straight track section (32) from the respective minimum level (5-6) to the level 7 of the returning straight track section (32).

7. Linear ball bush according to claim 1, characterised in that at least one of the straight track sections (30, 32) and the curved track sections (36) possess a channel cross-section the radius of curvature of which is approximately equal to a ball radius.

8. Linear ball bush according to claim 1, characterized in that the runner plates (14) rest in swinging manner on the inner circumferential surface of the bearing housing bore accommodating the cage (12), namely about an axis of swing which lies in plane perpendicular to the cage axis, approximately tangentially to said inner circumferential surface in the region of the middle of the length of the ball bush (10).

9. Linear ball bush according to claim 8, characterised in that the outer surface (16) of the runner plate (14) falls away from a middle region (VI) placed in the region of the axis of swing towards the ends of the runner plate (14), radially inwards in relation to the cage axis.

10. Linear ball bush according to claim 1, characterized in that at least one of the straight track sections (30, 32) and the curved track sections (36) possess a channel cross-section, the radius of curvature of which is slightly greater than a ball radius.

11. Linear ball bush according to claim 1, wherein said cage (12) has an outer circumferential surface about said cage axis, said external surface (16) of said runner plate (14) having, when viewed in an axial direction with respect to said cage axis, a circular shape which corresponds substantially to the circumference of said outer circumferential surface of said cage (12) and having, when viewed in a direction tangential to said outer circumferential surface of said cage (12) at the location of said runner plate (14) on said circumferential surface, a linear middle region (f) of finite length parallel to the track of the carrier ball row (22), said middle region (f) being adjoined by way of radially outwardly convex roundings (g) by axially outer longitudinally regions (h) which extend axially outwardly and radially inwardly from said middle region (f), wherein said outer surface (16) of said runner plate (14) within said middle region (f) is in substantially full face radially load transmitting contact with said internal circumferential face of said bearing housing bore when said shaft is axially aligned with the axis of said bearing housing bore, with said runner plate (14) being rotatable about two different rocking axes which are tangential with respect to said internal circumferential face of said bearing housing bore and located at said convex roundings (g), said rocking axes being spaced apart from each other a distance equal to about the axial length of said middle region (f).

12. Linear ball bush according to claim 11, characterized in that the axial total length (i) of a carrier ball row amounts to about 100% to about 200% of the respective shaft diameter, in that the axial length of the middle longitudinal region (f) amounts to about 2% to about 15% of the respective shaft diameter, in that the rounding (g) possesses a radius of curvature (g1) which amounts to more than 100% of the respective shaft diameter, and in that the inclination of the axially outer longitudinal regions (h) in relation to the path (30) of the carrier ball row (22) amounts on average to about 25 to about 45 minutes of angle.

13. Linear ball bush according to claim 11, characterized in that the axial total length (i) of a carrier ball row amounts to about 130% to about 180% of the respective shaft diameter, in that the axial length of the middle longitudinal region (f) amounts to about 5% to about 10% of the respective shaft diameter, in that the rounding (g) possesses a radius of curvature (g1) which amounts to more than 150% the respective shaft diameter, and in that the inclination of the axially outer longitudinal regions (h) in relation to the path (30) of the carrier ball row (22) amounts on average to about 35 minutes on angle.

14. Linear ball bush (10) comprising a cage (12) with a cage axis, an outer circumferential surface about said cage axis, and a plurality of ball circuits, where at least one ball circuit comprises two straight ball rows (22, 24) substantially parallel with the cage axis, namely a carrier ball row (22) and a return ball row (24), and two curved ball rows (28) connecting the two straight ball rows (22, 24), at least the carrier ball row (22) of one ball circuit rests radially outwards on a runner plate (14) which is inserted into a respective recess of the cage (12) and possesses an outer circumferential surface (16) for abutment on an inner circumferential surface of a bearing housing bore receiving the cage (12), a carrying straight track section (30) at least for the carrier ball row (22) of the respective ball circuit is formed on an inner surface (18) of the runner plate (14), and the respective carrier ball row (22) partially radially inwardly penetrates a slot (26) of the cage (12) in order to be able to take abutment on a shaft enclosed by the cage (12), said outer circumferential surface (16) of said runner plate (14) maintaining, when viewed in an axial direction with respect to said cage axis, a circular shape which corresponds substantially to the circumference of said outer circumferential surface of said cage (12), and having, when viewed in a direction tangential to said outer circumferential surface of said cage (12) at the location of said runner plate (14) on said circumferential surface, a linear middle region (f) of finite length parallel to the track (30) of the carrier ball row (22), said middle region (f) being adjoined by way of radially outwardly convex roundings (g) by axially outer longitudinal regions (h) which extend axially outwardly and radially inwardly from said middle region (f), wherein said outer circumferential surface (16) of said runner plate (14) within said middle region (f) is in substantially full face radial load transmitting contact with said inner circumferential surface of said bearing housing bore when said shaft is axially aligned with the axis of said bearing housing bore, with said runner plate (14) being rotatable about two different rocking axes which are tangential with respect to said inner circumferential face of said bearing housing bore and located at said convex roundings (g), said axes being spaced apart from each other a distance equal to about the axial length of said middle region (f).

15. Linear ball bush according to claim 14, characterised in that the axial total length (i) of a carrier ball row amounts to about 100% to about 200%, of the respective shaft diameter, in that the axial length of the middle linear region (f) amounts to about 2% to about 15% of the respective shaft diameter, in that the rounding (g) possesses a radius of curvature (g1) which amounts to more than 100% of the respective shaft diameter, and in that the inclination of the axially outer longitudinal regions (h) in relation to the path (30) of the carrier ball row (22) amounts on average to about 25 to about 45 minutes of angle.

16. Linear ball bush according to claim 14, characterised in that the axial total length (i) of a carrier ball row amounts to about 130% to about 180% of the respective shaft diameter, in that the axial length of the middle longitudinal region (f) amounts to about 5% to about 10% of the respective shaft diameter, in that the rounding (g) possesses a radius of curvature (g1) which amounts to more than 150% the respective shaft diameter, and in that the inclination of the axially outer longitudinal regions (h) in relation to the path (30) of the carrier ball row (22) amounts on average to about 35 minutes of angle.

* * * * *